Dec. 24, 1957
E. K. MACKENZIE ET AL
2,817,318
FLUID PRESSURE CONTROLLED POSITIONERS
FOR FLUID OPERATED MOTORS
Filed May 10, 1955
4 Sheets-Sheet 2
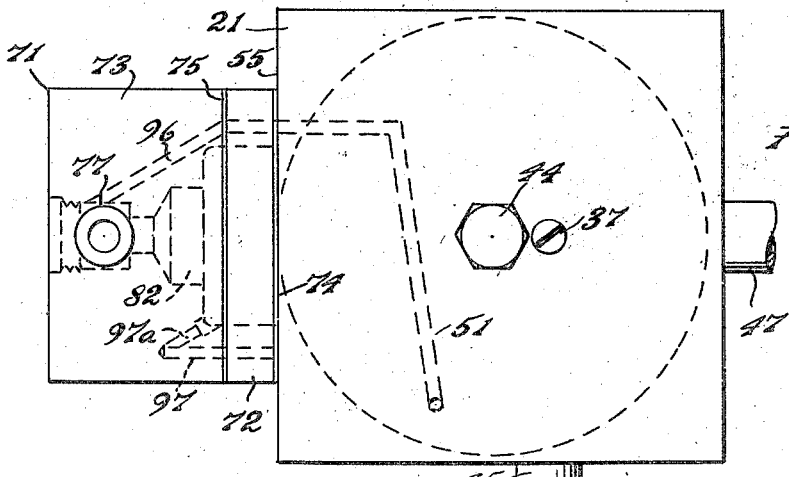
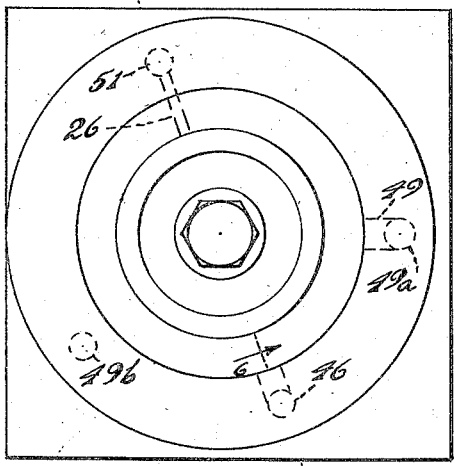
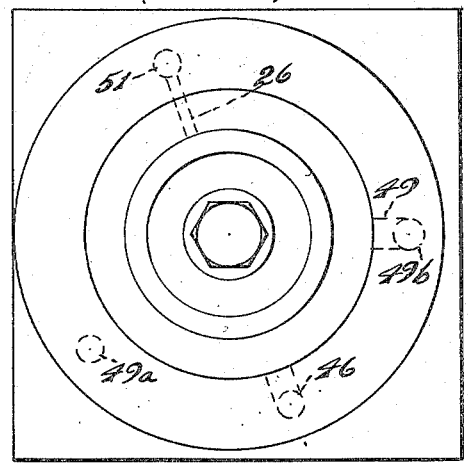
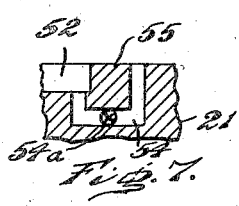
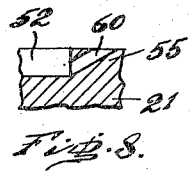
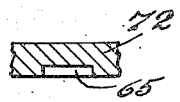
INVENTOR
Elbert K. Mackenzie
Robert G. Eisenhardt
BY
ATTORNEY.

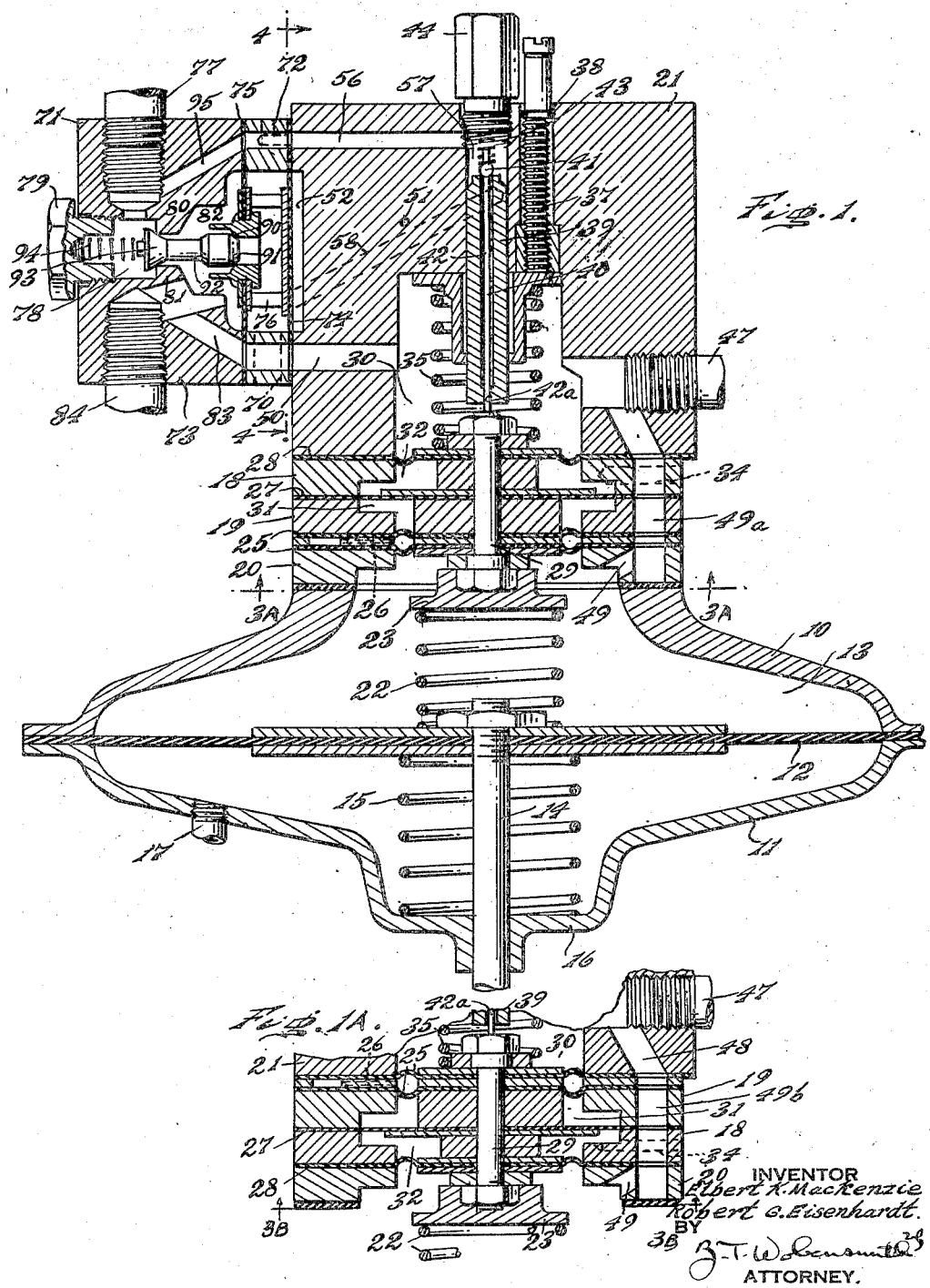

Dec. 24, 1957     E. K. MACKENZIE ET AL     2,817,318
FLUID PRESSURE CONTROLLED POSITIONERS
FOR FLUID OPERATED MOTORS
Filed May 10, 1955     4 Sheets-Sheet 3
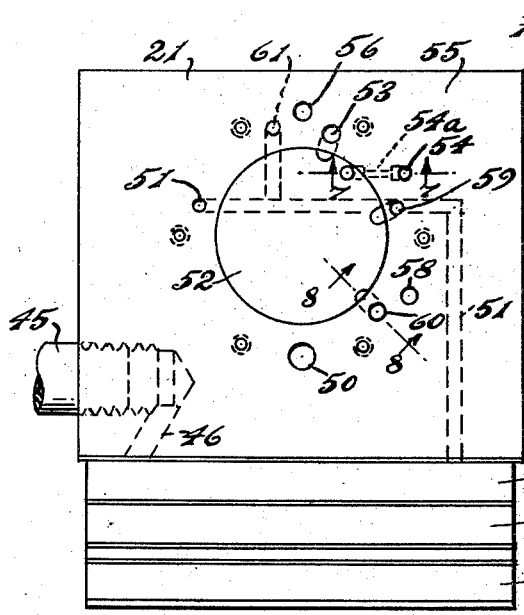
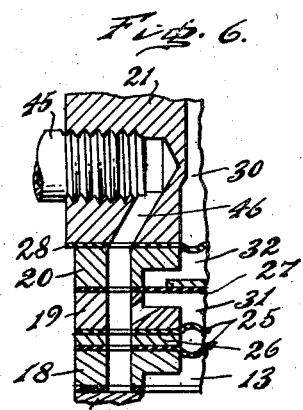
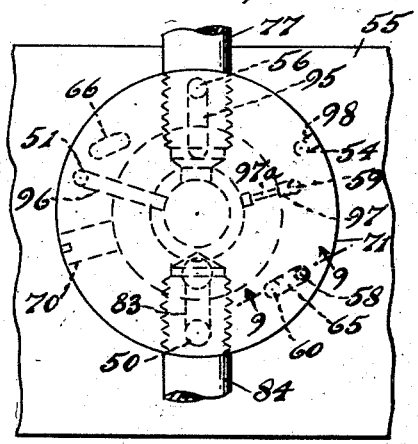
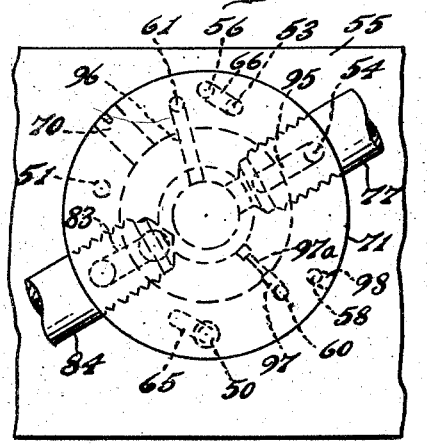
INVENTOR
Elbert K. Mackenzie
Robert G. Eisenhardt
BY
ATTORNEY.

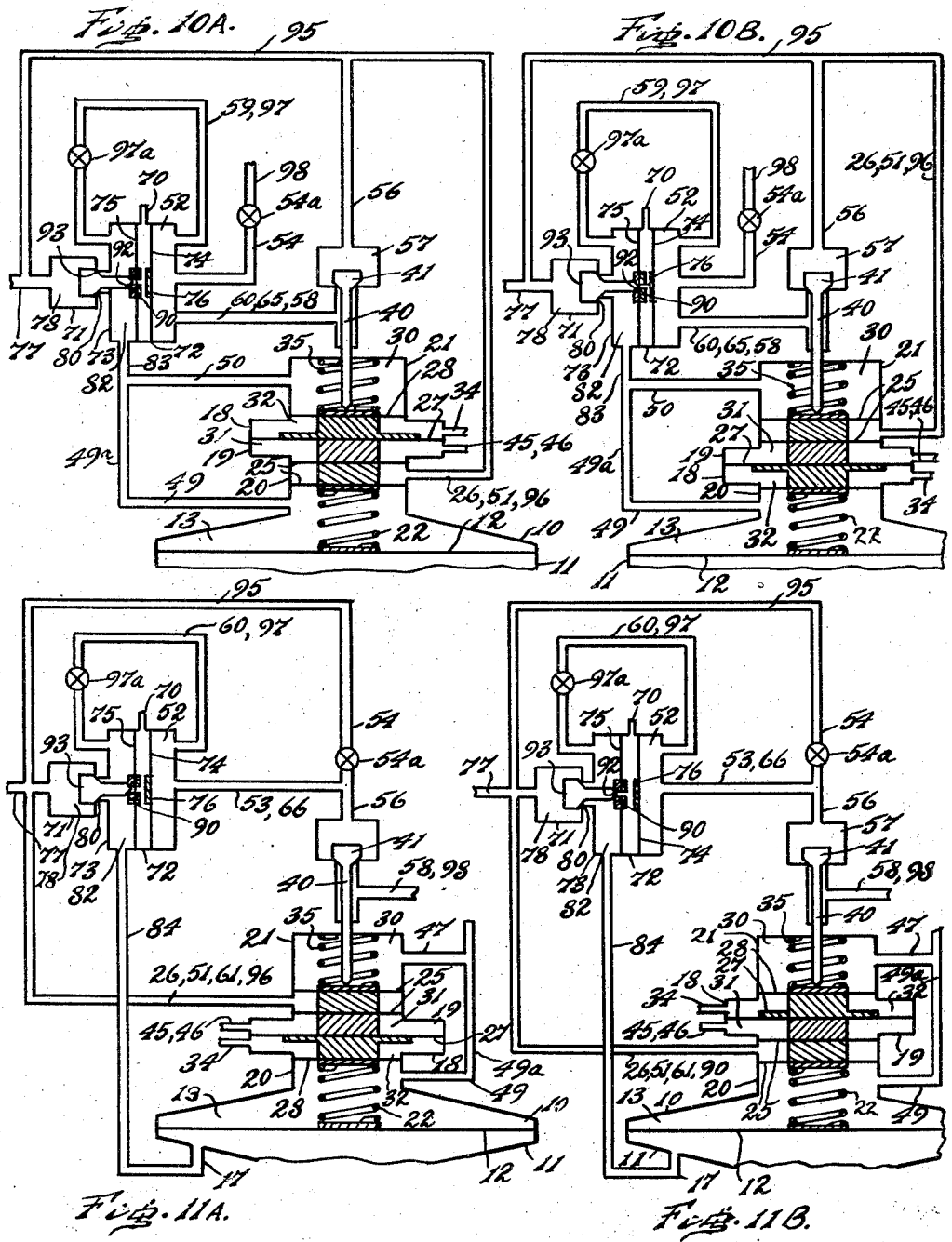

United States Patent Office 2,817,318
Patented Dec. 24, 1957

2,817,318

FLUID PRESSURE CONTROLLED POSITIONERS FOR FLUID OPERATED MOTORS

Elbert K. Mackenzie, Oreland, and Robert G. Eisenhardt, Upper Darby, Pa., assignors to Moore Products Co., Philadelphia, Pa., a corporation of Pennsylvania Application May 10, 1955, Serial No. 507,294

7 Claims. (Cl. 121—41)

This invention relates to positioners and more particularly to apparatus for providing accurate positioning of a fluid motor of the type employed with motor operated valves, and in other applications.

It has heretofore been proposed to provide pressure fluid operated valve positioners with a pilot valve for controlling the delivery of the pressure fluid to the motor chamber. It was ascertained that if the ports of such pilot valve were made large, to provide high speed of operation, this resulted in a loss of sensitivity. Upon attempting to employ an interposed relay to increase the speed of operation of the motor, an undesired instability often resulted.

It is the principal object of the present invention to provide a pilot operated positioner for fluid motors which is rapid yet stable in its operation.

It is a further object of the present invention to provide a pilot operated positioner for fluid motors having a primary pilot valve for controlling the operation of the motor and a second pilot valve or relay controlled by the primary pilot valve for controlling the fluid delivery to the motor.

It is a further object of the present invention to provide a pilot operated positioner having a primary pilot valve and a second pilot valve or relay as aforesaid, with provisions for overcoming instability.

It is a further object of the present invention to provide a positioner for fluid operated motors in which, while there is a reduction of sensitivity to provide stability for small unbalances, the full capacity of the system is at all times available for use with large unbalances.

It is a further object of the present invention to provide a positioner for fluid operated motors which may be quickly and easily changed at the place of use to adapt it for top or bottom loading as desired, and also for direct or reverse action, as desired.

Other objects and advantageous features of the invention will be apparent from the specification and claims.

The nature and characteristic features of the invention will be more readily understood from the following description, taken in connection with the accompanying drawings forming part thereof, in which:

Figure 1 is a vertical central sectional view, partly diagrammatic, of a positioner in accordance with the invention;

Fig. 1A is a view similar to Fig. 1 but with a different arrangement of the diaphragm assembly for top-reverse or bottom-direct application of pressure fluid to the motor;

Fig. 2 is a top plan view of the positioner shown in Fig. 1;

Fig. 3A is a horizontal sectional view taken approximately on the line 3A—3A of Fig. 1;

Fig. 3B is a horizontal sectional view taken approximately on the line 3B—3B of Fig. 1A;

Fig. 4 is a vertical sectional view taken approximately on the line 4—4 of Fig. 1;

Fig. 5A is a fragmentary side elevational view, as seen from the left of Fig. 1, and showing the relay positioned for application of pressure fluid at the top of the motor diaphragm;

Fig. 5B is a fragmentary side elevational view, similar to Fig. 5A showing the relay positioned for application of pressure fluid on the bottom of the motor diaphragm;

Fig. 6 is a fragmentary vertical sectional view taken approximately on the line 6—6 of Fig. 3A;

Fig. 7 is a fragmentary sectional view taken approximately on the line 7—7 of Fig. 4;

Fig. 8 is a fragmentary sectional view taken approximately on the line 8—8 of Fig. 4;

Fig. 9 is a fragmentary sectional view taken approximately on the line 9—9 of Fig. 5A;

Fig. 10A is a diagrammatic view showing the pneumatic circuit for top loading and direct action;

Fig. 10B is a diagrammatic view showing the pneumatic circuit for top loading and reverse action;

Fig. 11A is a diagrammatic view showing the pneumatic circuit for bottom loading and direct action; and Fig. 11B is a diagrammatic view showing the pneumatic circuit for bottom loading and reverse action.

It should, of course, be understood that the description and drawings herein are illustrative merely, and that various modifications and changes may be made in the structure disclosed without departing from the spirit of the invention.

Like numerals refer to like parts throughout the several views.

Referring more particularly to the drawings, in which a preferred embodiment of the invention is illustrated, upper and lower sections 10 and 11 of a diaphragm motor casing are shown, with a motor diaphragm 12 interposed therebetween in the usual manner. As shown, and for top loading, a fluid pressure or motor chamber 13 is provided above the diaphragm 12. The diaphragm 12 has a stem 14 connected thereto for movement therewith, and the stem 14 is connected to a valve plug (not shown) or other controlling element to be positioned. A diaphragm return spring 15 may be provided in engagement with the diaphragm 12 and with a shoulder 16 in the lower casing section 11, for urging the diaphragm 12 upwardly in opposition to the fluid pressure applied in the chamber 13. Above the upper casing section 10, diaphragm housing sections 18, 19 and 20 are secured in position with an upper housing 21 thereabove in fixed relation.

Within the upper casing section 10, diaphragm connectors are provided which include a range determining compression spring 22 in engagement with the motor diaphragm 12 and with a spring abutment 23. The abutment 23 is in turn in abutting relation to a diaphragm assembly hereinafter described.

The diaphragm assembly preferably includes a compound diaphragm 25 of the type shown in Patent No. 2,653,578, to C. B. Moore, and with a supply connection 26 extending between the separated diaphragms to provide the requisite internal pressure in excess of that externally applied. The compound diaphragm 25 is illustrated in Fig. 1 as interposed between the housing sections 19 and the housing section 20.

An intermediate diaphragm 27 is provided, interposed between the housing sections 18 and 19, and preferably has a larger effective area than the diaphragm 25.

An upper diaphragm 28 is provided, interposed between the housing sections 18 and 21, and preferably has approximately the same effective area as the diaphragm 25.

The diaphragms 25, 27 and 28 are preferably connected together in spaced relation for simultaneous movement by a connector 29, and provide chambers 30, 31 and 32, to which reference will be made. The chamber 32 is vented to the atmosphere through a port 34.

The upper face of the diaphragm 28 has one end of a zero adjusting compression spring 35 in engagement therewith, the other end of the spring 35 being in engagement with a spring abutment 36. The position of the spring abutment 36 is adjustable by means of an adjusting screw 37 which is sealed against fluid leakage by a packing ring 38. The spring abutment 36 is slidably carried on a sleeve 39 in the upper housing 21 and within the chamber 30.

Within the upper housing 21, a pilot valve is provided which includes a valve rod 40 having a valve plug 41 for engagement in the upper end of a bore 42 in the sleeve 39. The lower end of the bore 42, as at 42a, is of reduced diameter to provide a close clearance with respect to and guide the valve rod 40 while minimizing fluid leakage at this location. The valve rod 40 is adapted to engage or be engaged by the upper terminal end face of the connector 29 and is urged downwardly by a seating compression spring 43 in engagement with a closure plug 44 in fluid tight engagement in the upper end of the upper housing 21.

The upper housing 21 has a fluid connection 45 extending thereto for the delivery of the control or instrument pressure which, through a passageway 46, is available in the chamber 31.

The upper housing 21 has a fluid connection 47 in communication with the chamber 30, and passageway 48, which connects to a passageway 49a extending through the diaphragm housings 18, 19 and 20 and through passageway 49 into communication with the chamber 13.

The upper housing 21 has a side face 55 to which a plurality of passageways extend. A passageway 56 extends through the upper housing 21 to the face 55 from a chamber 57, between the closure plug 44 and the upper end of the sleeve 39, and a passageway 58 extends to the face 55 from the interior of the sleeve 39 below the valve plug 41.

The upper housing 21 has therein a passageway 51 extending to the side face 55 and to the connection 26.

The upper housing 21 also has therein a chamber 52 with which passageways 53, 54, 59 and 60 communicate, these passageways also extending to the side face 55 in spaced and predetermined arrangement. The passageway 54 has a restriction 54a therein. A passageway 61 is also provided from the passageway 51 to the side face 55.

The face 55 is adapted to have secured thereto, a pilot valve or relay 71. The pilot valve 71 as hereinafter pointed out, is adapted to be positioned on the face 55 in accordance with whether the actuating fluid pressure is applied on the upper or the lower face of the motor diaphragm 12.

The pilot valve or relay 71 has a diaphragm housing 72 and a valve housing 73. The face of the diaphragm housing 72 towards the face 55 of the housing 21 is provided with connecting grooves 65 and 66, one of which is illustrated in Fig. 9.

A diaphragm 74 is interposed between the housing 72 and the face 55 and a diaphragm 75 is interposed between the housings 72 and 73. The diaphragms 74 and 75 are connected by a connector 76 for movement together and have the space therebetween vented to the atmosphere by a vent passageway 70.

The valve housing 73 has a supply connection 77 connected thereto, the connection 77 being in communication with any suitable supply of pressure regulated and filtered fluid, such as air. The valve housing 73 has an interior chamber 78 with which the supply connection 77 communicates, the chamber having a closure plug 79 and opposite thereto a seat 80 formed in a boundary wall 81 thereof. The seat 80 can be of relatively large size. Within the interior of the valve housing 73, and on the opposite side of the wall 81 from the chamber 78, a chamber 82 is provided, bounded in part by the diaphragm 75.

The chamber 82 has a passageway 83 extending therefrom and through the housing 73 and the housing 72 for connection to the desired passageway on the face 55, shown in Figs. 1, 4 and 5A as passageway 50. A threaded connection 84 is provided in communication with the passageway 83.

The diaphragm 75 has a valve seat 90 carried thereon for engagement by a seating portion 91 of a valve plunger 92 which also has another seating portion 93 for engagement with the valve seat 80, and a seating spring 94 is in engagement with the plunger 92.

It will be noted that a pilot valve or relay 71 requires a finite pressure change between the point at which the exhaust port at the seat 90 just closes and the supply port at the seat 80 just opens. The amount of this change depends on the magnitude of the unbalanced forces on the valve plunger 92.

A passageway 95 is also provided, extending from the supply connection 77 and through the housing 73 and the housing 72 for connection to the desired passageway on the face 55, shown in Fig. 1 as the passageway 56.

The housings 73 and 72 also have a passageway 96 communicating with the supply connection 77 and connected, as shown in Figs. 1 and 2, to the passageway 51, and a fluid connection or passageway 97 having a restriction 97a, therein, variable if desired, extending from the chamber 82 through the housings 73 and 72 for communication with the passageway 59 and thence to chamber 52.

The housing 72 has a vent connection 98, in communication with the atmosphere.

The mode of use for direct action and top loading will now be pointed out, reference being had particularly to Figs. 1, 2, 3A, 4, 5A, 6 to 9, inclusive and 10A.

As previously indicated, the positioner is shown as mounted on a diaphragm motor having a motor chamber 13 with the stem 14 of the motor movable for positioning and with downward motion of the motor stem 14 effective to compress the spring 15.

Pressure fluid at a controlled pressure is supplied from any suitable source, such as a master controller (not shown) to the fluid connection 45 and through the passageway 46 to the chamber 31 beneath the diaphragm 27 where it acts in opposition to the force exerted by the spring 35 and tends to cause upward movement of the diaphragm assembly.

Pressure fluid from any suitable source of pressure regulated fluid, such as air, is supplied to the fluid connection 77, and through the passageways 96 and 51 and through the supply connection 26 to the space between the diaphragms 25. Such fluid is also supplied from the fluid connection 77 to the chamber 78, and through the passageways 95 and 56 to the chamber 57.

Upward motion of the diaphragm assembly causes the plug 41 to move upwardly with respect to the valve seat at the upper end of the bore 42 and control the admission of fluid from the chamber 57 to the bore 42, and through passageway 58 to the chamber 52. The chamber 52 is vented to the atmosphere through passageway 54, with its restriction 54a, and through passageway 98.

When fluid is being supplied from the valve 41 at a greater rate than it exhausts through the restriction 54a, the pressure in the chamber 52 will rise. This pressure is effective against the diaphragm 74 to move the diaphragms 74 and 75 to a position tending to close the seat 90 against the seating portion 91 of the valve plug 92, and move the valve portion 93 away from its seat 80. Fluid under pressure passing the seat 80 is effective from the chamber 82 through the passageways 83 and 50 and in the chamber 30.

The pressure of the fluid effective in the chamber 30 is also effective through the passageways 48, 49a and 49 in the chamber 13 tending to move the diaphragm 12 downwardly to the desired position as determined by the control pressure applied in the chamber 31. Downward movement of the diaphragm 12 is also effective, through the spring 22 and abutment 23 for reducing the upward forces on the diaphragm assembly and thus to rebalance the diaphragm assembly substantially at its initial position.

The foregoing explanation is for the condition in which an increase in pressure from the source of control pressure causes an increase in the pressure applied at the motor diaphragm 12. This is referred to herein as direct action. The condition in which the pressure applied to the motor diaphragm 12 decreases when the control pressure increases is herein called reverse action.

If desired, the actuating pressure can be applied on the top face of the motor diaphragm 12, as heretofore described, or can be applied on the bottom face of the motor diaphragm 12.

The spring 15, which provides an opposing force to the pressure from the positioner applied on the diaphragm 12 can be omitted if some other resilient device be employed, such as fluid pressure. If such fluid pressure be employed it will be applied to the opposite side of the diaphragm 12 from that on which the positioner applies its actuating pressure.

The term "top loaded" is applied to the condition where the actuating pressure from the positioner is applied to the top or upper side of the diaphragm 12 and the term "bottom loaded" to the condition where the actuating pressure is applied on the lower or bottom side of the diaphragm 12.

The various conditions encountered in the process industries or in the use of diaphragm operated valves may require any one of the four combinations, i. e., top loaded direct acting (see Fig. 10A), top loaded reverse acting (see Fig. 10B), bottom loaded direct acting (see Fig. 11A) or bottom loaded reverse acting (see Fig. 11B).

The operation previously described is for top loaded direct action.

If it is desired to change from top loading to bottom loading this may be readily effected by changing the mounting of the relay 71 from the position shown in Fig. 5A to that shown in Fig. 5B, connecting the fluid connection 84 to a connection 17 to the chamber below the diaphragm 12, the fluid connection at 47 being connected to another source of fluid under pressure to provide a downward force on the diaphragm 12 as heretofore described (see Figs. 11A and 11B).

It will be noted that the chamber 82 no longer communicates with the chamber 30.

Fluid under pressure from the fluid connection 77 passes through the fluid connection 54 and restriction 54a to the chamber 52 and from the chamber 52 passes through the passageway 53, the groove 66 and the passageway 56 to the chamber 57, then past the valve plug 41 through the bore 42 and the passageways 58 and 98 to atmosphere.

Upon an increase in pressure in the chamber 31, the diaphragm assembly moves upwardly and moves the valve plug 41 from its seat on the sleeve 39, allowing fluid to escape from chamber 52 faster than it is supplied through the restriction 54a. The decrease in pressure effective on the diaphragm 74 tends to close seating portion 93 against its seat 80 and opens the valve seat 90 with respect to the valve portion 91 to decrease the fluid pressure in the chamber 82. The pressure in the chamber 82 is also effective on the underside of the diaphragm 12 so that diaphragm 12 will move in a downward direction, elongating spring 22 and permitting the diaphragm assembly to move downwardly to rebalance. It will be noted that this is bottom loaded reverse action.

If it is desired to change from bottom loaded reverse acting to bottom loaded direct acting or from top loaded direct acting to top loaded reverse acting this can be readily effected by changing the diaphragm assembly from the arrangement illustrated in Figs. 1 and 3A to that illustrated in Figs. 1A and 3B. It will be noted that this requires merely turning the diaphragm assembly, including the housings 18 and 19 and the diaphragms 25, 27 and 28, together through an angle of 180° about the line a—a as an axis.

The communication through the passageway 51 and the supply connection 26 is continued as before, the communication through the passageway 46 is continued as before, and the passageway 49b is substituted for the passageway 49a. The control pressure is then applied, as shown in Figs. 1A and 10B or 11A, in the chamber 31 but so as to be effective in a downward direction on the diaphragm assembly. The chamber 32 is vented to the atmosphere, as before, through the passageway 34.

The operation of the positioner upon a decrease in control pressure is identical to that described above for an increase in control pressure for the bottom loaded reverse action.

Similarly, the arrangement shown in Figs. 1A and 3B and in Fig. 5A will provide top loaded reverse action. The operation under these conditions, upon a decrease of control pressure, is identical to that described for an increase of control pressure for the top loaded direct action (cf. Figs. 10A and 10B).

It will be noted from Figs. 4, 5A, 5B, 8, 10A, 10B, 11A and 11B that, under all conditions of operation, the chamber 82 is connected through the passageway 97 which contains the restriction 97a and which is connected in turn through the passageway 60 or through the passageway 59 with the chamber 52.

The chamber 52 is the input pressure chamber of the relay 71 while the chamber 82 is the output pressure chamber of this relay.

The relay 71, as a one to one pressure transmitter, reproduces in chamber 82 whatever pressure is effective in the chamber 52. However, because of the unbalanced forces effective on the valve plunger 92, the reproduction of pressures will depart from the exact one to one ratio and will tend to fall behind the changes of pressure in the chamber 52, exhibiting a condition referred to as "hysteresis," "dead spot" or "cross over."

The fluid connection 97 with its restriction 97a serves several purposes. One purpose is to transmit small pressure changes from the chamber 52 to the motor chamber 13 via chamber 82 when these changes are too small to overcome the "dead spot" of the relay 71. The diaphragm motor is thereby enabled to respond to extremely small unbalances so that the motor diaphragm 12 can come to an exact location for balance without regard to the "dead spot" of the relay 71.

Another purpose of the fluid connection 97 with its restriction 97a is to reduce the gain of the relay 71, particularly for small changes of pressure in the chamber 52. This is accomplished by bleeding off from the chamber 52 to the chamber 82 some of the pressure change resulting from movement of the valve plug 41. This reduction in gain, which occurs mainly near the condition of equilibrium, allows the diaphragm motor to approach equilibrium more slowly so that it does not tend to overshoot or hunt. For large pressure changes or unbalances, in excess of the dead spot, the gain of the relay 71 approaches the one to one ratio and the large ports of this relay are effective to deliver the large quantities of pressure fluid required for rapid movement of the diaphragm 12.

It has been found that for a particular size of valve, motor chamber size and specific working conditions, a particular size of restriction 97a gives optimum stability and speed of positioning action, and although the complete factors controlling the size are not fully understood the proper size of restriction 97a can be easily selected.

We claim:

1. In a positioner for a movable member in an expansible chamber, a connection to a source of variable control pressure, a connection to a supply of fluid under pressure, a fluid pressure operated relay connected to said supply connection and to a delivery connection, said delivery connection being in communication with said expansible chamber, a pilot valve for supplying pressure fluid in response to variations in said control pressure for controlling said pressure operated relay, a resilient connection between said movable member and said pilot valve, and a fluid connection between said pilot valve and said delivery connection.

2. In a positioner for a movable member in an expansible chamber, a connection to a source of variable control pressure, a connection to a supply of fluid under pressure, a fluid pressure operated relay having a control chamber, said relay being connected to said supply connection and to a delivery connection, said delivery connection being in communication with said expansible chamber, a pilot valve for supplying pressure fluid from said supply connection to said control chamber in response to variations in said control pressure for controlling said pressure operated relay, a restricted passageway between said control chamber and the atmosphere, a resilient connection between said movable member and said pilot valve, and a fluid connection between said control chamber and said delivery connection.

3. In a positioner for a movable member in an expansible chamber, a connection to a source of variable control pressure, a connection to a supply of fluid under pressure, a fluid pressure operated relay having a control chamber, said relay being connected to said supply connection and to a delivery connection, said delivery connecting being in communication with said expansible chamber, a restricted passageway for supplying pressure fluid from said supply connection to said control chamber, a pilot valve for controlling the exhaust of fluid from said control chamber to the atmosphere in response to variations in said control pressure, a resilient connection between said movable member and said pilot valve, and a fluid connection between said control chamber and said delivery connection.

4. A positioner as defined in claim 1 in which a housing member is provided in which said pilot valve is mounted and on which said relay is mounted in a predetermined position for delivery of pressure fluid to a predetermined side of said movable member.

5. A positioner as defined in claim 1 in which a housing member is provided in which said pilot valve is mounted and on which said relay is mounted in a predetermined position for delivery of pressure fluid to a predetermined side of said movable member and is movable to a different predetermined position for delivery of pressure fluid to the opposite side of said movable member.

6. A positioner as defined in claim 1 in which control means is provided for opening said pilot valve in response to a rise in said control pressure, said control means being movable to a different position for closing said pilot valve in response to a rise in said control pressure.

7. A positioner as defined in claim 1 in which said fluid connection has a restriction therein.

References Cited in the file of this patent

UNITED STATES PATENTS

| | | |
|---|---|---|
| 2,080,212 | Otto | May 11, 1937 |
| 2,131,386 | Spitzglass | Sept. 27, 1938 |
| 2,179,450 | Gorrie | Nov. 7, 1939 |
| 2,298,112 | Edwards | Oct. 6, 1942 |
| 2,638,875 | Bowditch | May 19, 1953 |
| 2,711,754 | McKinney | June 28, 1955 |